(12) United States Patent
Stamm

(10) Patent No.: US 6,424,666 B1
(45) Date of Patent: Jul. 23, 2002

(54) LINE-NARROWING MODULE FOR HIGH POWER LASER

(75) Inventor: Uwe Stamm, Goettingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/694,246

(22) Filed: Oct. 23, 2000

Related U.S. Application Data (63) Continuation-in-part of application No. 09/599,130, filed on Jun. 22, 2000, and a continuation-in-part of application No. 09/657,396, filed on Sep. 8, 2000.
(60) Provisional application No. 60/178,440, filed on Jan. 27, 2000, provisional application No. 60/140,531, filed on Jun. 23, 1999, and provisional application No. 60/162,735, filed on Oct. 29, 1999.

(51) Int. Cl.[7] .................................................. H01S 3/13
(52) U.S. Cl. ............................ 372/32; 372/34; 372/25; 372/9; 372/98; 372/92; 372/99; 372/20; 372/100; 372/19
(58) Field of Search .............................. 372/32, 34, 25, 372/9, 19, 57, 98, 92, 99, 20, 100, 29, 2

(56) References Cited

U.S. PATENT DOCUMENTS

| | | | |
|---|---|---|---|
| 3,471,800 A | 10/1969 | Congleton et al. | 331/94.5 |
| 3,546,622 A | 12/1970 | Peterson et al. | 331/94.5 |
| 3,609,586 A | 9/1971 | Danielmeyer | 331/94.5 |
| 3,611,436 A | 10/1971 | Rigrod | 372/20 |
| 3,775,699 A | 11/1973 | Cassels | 372/19 |

(List continued on next page.)

FOREIGN PATENT DOCUMENTS

| | | | | |
|---|---|---|---|---|
| DE | 298 22 090.3 | 3/1999 | | H01S/3/08 |
| EP | 0 472 727 A1 | 3/1992 | | H01S/3/1055 |
| EP | 0 395 717 B1 | 9/1993 | | A61B/17/36 |
| EP | 778 642 A2 | 12/1996 | | H01S/3/03 |
| EP | 0 402 570 B1 | 1/1998 | | H01S/3/08 |

(List continued on next page.)

OTHER PUBLICATIONS

S. Marcus, "Cavity Dumping and Coupling Modulation of an Electron–Coupled CO2 Laser," *J. Appl. Phys.* vol. 53, No. 9, Sep. 1982, pp. 6029–6031.

Irving J. Bigio, et al., "injectionLocking Unstable Resonator Excimer Lasers," *IEEE J. of Quantum Electronics*, vol. QE–19, No. 9, Sep. 1983, pp. 1426–1436.

T.J. McKee, "Spectral–narrowing Techniques for Excimer Laser Oscillators," *Canadian J. of Physics*, vol. 63, No. 2, Feb. 1985, pp. 214–219.

E. Armandillo, et al., "Simple, Compact, High–Repetition Rate XeCl Laser," *Review of Scientific Instruments*, vol. 56, No. 5, Part 1, May 1985, pp. 674–676.

V. N. Ischenko, et al., "High–power Efficient Vacuum Ultraviolet F2 Laser Excited by an Electric Discharge," *Soviet J. of Quantum Electronics*, vol. 16, No. 5, American Institute of Physics, May 1986, pp. 707–709.

(List continued on next page.)

*Primary Examiner*—Leon Scott, Jr.
(74) *Attorney, Agent, or Firm*—Sierra Patent Group, Ltd.; Andrew V. Smith (57) ABSTRACT

An excimer or molecular fluorine laser includes a gain medium surrounded by a resonator and including a line-narrowing module preferably including a prism beam expander and one or more etalons and/or a grating or grism within the resonator. The material of transmissive portions of the line-narrowing module including the prisms and the plates of the etalons comprises a material having an absorption coefficient of less than $5\times10^{313}$ /cm at 248 nm incident radiation, less than $10\times10^{-3}$/cm at 193 nm incident radiation, and less than 0.1/cm at 157 nm. Preferably the material also has a thermal conductivity greater than 2.0 W/m° C.

32 Claims, 4 Drawing Sheets

U.S. PATENT DOCUMENTS

| | | | |
|---|---|---|---|
| 3,868,592 A | 2/1975 | Yarborough et al. | 331/94.5 |
| 4,393,505 A | 7/1983 | Fahlen | 372/57 |
| 4,399,540 A | 8/1983 | Bucher | 372/20 |
| 4,611,270 A | 9/1986 | Klauminzer et al. | 364/183 |
| 4,616,908 A | 10/1986 | King | 350/576 |
| 4,691,322 A | 9/1987 | Nozue et al. | 372/82 |
| 4,696,012 A | 9/1987 | Harshaw | 372/99 |
| 4,829,536 A | 5/1989 | Kajiyama et al. | 372/57 |
| 4,856,018 A | 8/1989 | Nozue et al. | 372/98 |
| 4,860,300 A | 8/1989 | Baumler et al. | 372/57 |
| 4,873,692 A | 10/1989 | Johnson et al. | 372/20 |
| 4,905,243 A | 2/1990 | Lokai et al. | 372/32 |
| 4,926,428 A | 5/1990 | Kajiyama et al. | 372/20 |
| 4,942,583 A | 7/1990 | Nazarathy et al. | 372/20 |
| 4,972,429 A | 11/1990 | Herbst | 372/100 |
| 4,975,919 A | 12/1990 | Amada et al. | 372/33 |
| 4,977,563 A | 12/1990 | Nakatani et al. | 372/32 |
| 4,985,898 A | 1/1991 | Furuya et al. | 372/106 |
| 5,025,445 A | 6/1991 | Anderson et al. | 372/20 |
| 5,081,635 A | 1/1992 | Wakabayashi et al. | 372/57 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,161,238 A | 11/1992 | Mehmke | 359/738 |
| 5,221,823 A | 6/1993 | Usui | 219/121.78 |
| 5,226,050 A | 7/1993 | Burghardt | 372/20 |
| 5,337,330 A | 8/1994 | Larson | 372/86 |
| 5,396,514 A | 3/1995 | Voss | 372/57 |
| 5,404,366 A | 4/1995 | Wakabayashi et al. | 372/29 |
| 5,414,723 A | 5/1995 | Krapchev | 372/3 |
| 5,440,574 A | 8/1995 | Sobottke et al. | 372/34 |
| 5,450,207 A | 9/1995 | Fomenkov | 356/416 |
| 5,479,431 A | 12/1995 | Sobottke et al. | 372/92 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,816 A | 9/1996 | Basting et al. | 372/27 |
| 5,596,456 A | 1/1997 | Luecke | 359/831 |
| 5,596,596 A | 1/1997 | Wakabayashi et al. | 372/102 |
| 5,646,954 A | 7/1997 | Das et al. | 372/55 |
| 5,657,334 A | 8/1997 | Das et al. | 372/33 |
| 5,659,419 A | 8/1997 | Lokai et al. | 359/330 |
| 5,663,973 A | 9/1997 | Stamm et al. | 372/20 |
| 5,684,822 A | 11/1997 | Partlo | 372/95 |
| 5,729,562 A | 3/1998 | Birx et al. | 372/38 |
| 5,729,565 A | 3/1998 | Meller et al. | 372/87 |
| 5,748,316 A | 5/1998 | Wakabayashi et al. | 356/352 |
| 5,748,346 A | 5/1998 | David et al. | 359/15 |
| 5,761,236 A | 6/1998 | Kleinschmidt et al. | 372/10 |
| 5,763,855 A | 6/1998 | Shioji | 219/121.84 |
| 5,802,094 A | 9/1998 | Wakabayashi et al. | 372/57 |
| 5,811,753 A | 9/1998 | Weick et al. | 219/121.78 |
| 5,818,865 A | 10/1998 | Watson et al. | 372/86 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/20 |
| 5,914,974 A | 6/1999 | Partlo et al. | 372/38 |
| 5,917,849 A | 6/1999 | Ershov | 372/102 |
| 5,936,988 A | 8/1999 | Partlo et al. | 372/38 |
| 5,940,421 A | 8/1999 | Partlo et al. | 372/38 |
| 5,946,337 A | 8/1999 | Govorkov et al. | 372/57 |
| 5,949,806 A | 9/1999 | Ness et al. | 372/38 |
| 5,970,082 A | 10/1999 | Ershov | 372/102 |
| 5,978,391 A | 11/1999 | Das et al. | 372/20 |
| 5,978,394 A | 11/1999 | Newman et al. | 372/32 |
| 5,978,406 A | 11/1999 | Rokni et al. | 372/58 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | 372/57 |
| 5,991,324 A | 11/1999 | Knowles et al. | 372/57 |
| 5,999,318 A | 12/1999 | Morton et al. | 359/572 |
| 6,005,880 A | 12/1999 | Basting et al. | 372/38 |
| 6,014,206 A | 1/2000 | Basting et al. | 356/138 |
| 6,014,398 A | 1/2000 | Hofmann et al. | 372/60 |
| 6,020,723 A | 2/2000 | Desor et al. | 320/166 |
| 6,028,879 A | 2/2000 | Ershov | 372/57 |
| 6,028,880 A | 2/2000 | Carlesi et al. | 372/58 |
| 6,061,382 A | 5/2000 | Govorkov et al. | 372/101 |
| 6,028,872 A | 6/2000 | Partlo et al. | 372/38 |
| 6,137,821 A * | 10/2000 | Ershov | 372/19 |
| 6,154,470 A * | 11/2000 | Basting et al. | 372/57 |
| 6,240,110 B1 * | 5/2001 | Ershov | 372/20 |

FOREIGN PATENT DOCUMENTS

| | | | | |
|---|---|---|---|---|
| EP | 00955706 A1 | 1/1999 | | H01S/3/08 |
| JP | 61-139960 | 6/1986 | | |
| JP | 8-274399 | 11/1986 | | H04S/3/104 |
| JP | 61-160783 | 7/1987 | | H01S/3/08 |
| JP | 63-45875 | 2/1988 | | H01S/3/08 |
| JP | 1-179477 | 7/1989 | | H01S/3/08 |
| JP | 2-152288 | 6/1990 | | H01S/3/106 |
| JP | 3-82183 | 4/1991 | | H01S/3/08 |
| JP | 60-205420 | 10/1995 | | |
| JP | 10-209533 | 8/1998 | | H01S/3/08 |
| WO | WO 96/16455 | 5/1996 | | H01S/3/08 |
| WO | WO 99/19952 | 4/1999 | | H01S/3/22 |

OTHER PUBLICATIONS

R.K. Brimacombe, et al., "Line–narrowed Industrial Excimer Laser for Microlithography," *Conference on Lasers and Electro–Optics*, 1989 Technical Digest Series, vol. 11, Apr. 24–29, 1989, Baltimore, MD, 24 pages.

K. Wani, et al., "Narrow–band KrF Excimer Laser —Tunable and Wavelength Stabilized," *SPIE—The International Society for Optical Engineering*, Excimer Beam Applications, vol. 998, Sep. 6, 1998, Boston, MA, 10 pages.

D.R. Hall et al., "The Physics and Technology of Laser Resonators," 1992, pp. 224.

M. Kakehata, et al., "Experimental Study of Tunability of a Discharge Pumped Molecular Fluorine Laser," *Conference on Lasers and Electro–optics*, vol. 7, Optical Society of America, May 1990, pp. 106–108.

R.L. Sandstrom, "Measurements of Beam Characteristics Relevant to DUV Microlithography of KrF Excimer Laser," *SPIE Optical/Laser Microlithography III*, vol. 1264, 1990, pp. 505–519.

D. Basting, "Industrial Excimer Lasers," pp. 40–41.

Z. Haixing, et al., "Some Problems in 1:1 Broadband Excimer Laser Lithography," Proceedings SPIE Optical/Laser Microlithography V, Mar. 11–13, 1992, vol. 1674, pp. 701–705.

M. Mizoguchi, et al., "100–fs, 10–Hz, terawatt KrF Laser," *J. of Opt. Soc. Am. B*, vol. 9, No. 4, Apr. 1992, pp. 560–564.

J.H.C. Sedlacek, et al., "Optical Materials for Use with Excimer Lasers," *SPIE*, vol. 1835, Excimer Lasers, 1992, pp. 80–88.

D. J. Krajnovich, et al., "Testing of the Durability of Single–Crystal Calcium Fluoride with and without Antireflection Coatings for Use with High–power KrF Excimer Lasers," *Applied Optics*, vol. 31, No. 28, Oct. 1, 1992, pp. 6062–6075.

Shintaro Kawata, et al., "Spatial Coherence of KrF Excimer Lasers," *Applied Optics*, vol. 31, No. 3, Jan. 20, 1992, pp. 387–395.

Nagai, et al., Development of High Power Narrow Spectrum–Tunable Excimer Laser, *Mitsubishi Heavy Industries Report*, vol. 30, No. 5, 1993–9, pp. 443–446. (Japanese Article and Translation included).

Abstract and Handouts of an Aug. 15–18, 1995 conference in Colorado Springs, Colorado, from the First International Symposium on 193nm Lithography. "ArF Excimer Laser with Repetiition Rate for DUV Lithography," by R. Patzel, et al., 21 pages.

Y.G. Basov, "Telescopic and Dispersive Prism Devices for Laser Technology," *J. Opt. Technol.*, vol. 62, No. 3, Mar. 1995, pp. 141–152.

M. Rothschild, et al., "Optical Materials for 193 nm Lithography," *First Intl. Symp. On 193 nm Lithography*, Digest of Abstracts, Aug. 15–18, 1995.

M. Rothschild, et al., "193–nm Lithography," Proceedings of SPIE, Lasers as Tools for Manufacturing of Durable Goods and Microelectronics, Jan. 29–Feb. 2, 1996, San Jose, CA, vol. 2703, pp. 398–404.

Press Release entitled: "Lambda Physik shows readiness for the future challenges of microlithography," Fort Lauderdale, FL. 1997.

J. H. C. Sedlaek, et al., "Performance of Excimer Lasers as Light Sources for 193–nm Lithography," Proceedings of SPIE, Optical Microlithography X, Mar. 12–14, 1997, Santa Clara, CA, vol. 3051, pp. 874–881.

Technology World Briefs, "Lasers Could Extend Optical Lithography into DUV," *Photonics Spectra*, Jan. 1998.

D. Basting, et al., "Processing of PTFE with High Power VuV Laser Radiation," 2 pages.

S.A. Myers, "An Improved Line Narrowing Technique for a Dye Laser Excited by a Nitrogen Laser," *Optics Communications*, vol. 4, No. 2, Oct. 1971, pp. 187–189.

T.W. Hansch, "Repetitively Pulsed Tunable Dye Laser for High Resolution Spectroscopy," *Applied Optics*, Apr. 1972, vol. 11, No. 4, pp. 895–898.

A. Boom, "Modes of a Laser Resonator Containing Tilted Birefringent Plates," *J. of the Optical Society of America*, vol. 64, No. 4, Lancaster Press, Inc., Lancaster, PA, Apr. 1974, pp. 447–452.

M. Okada, et al., "Electronic Tuning of Dye Lasers by an Electrooptic Bierfringent Fabry–Perot Etalon," *Optics Communications*, vol. 14, No. 1, North–Holland Publishing Co., Amsterdam, May 1975, pp. 4–7.

J. R. Woodworth, et al., "An Efficient, High–Oower F2 Laser Near 157nm," *J. of Chem. Physics*, vol. 69, No. 6, American institute pf Physics, Sep. 15, 1978, pp. 2500–2504.

S. Saikan, "Nitrogen–Laser–Pmped Single–Mode Dye Laser," *Applied Physics*, 1978, 4 pages.

H. Lengfellner, "Generation of Tunable Pulsed Microwave Radiation by Nonlinear Interaction of Nd:YAG Laser Radiation in GaP Crystals," *Optics Letters*, vol. 12, No. 3, Mar. 1982, pp. 184–186.

* cited by examiner

LINE-NARROWING MODULE FOR HIGH POWER LASER

PRIORITY

This application claims the benefit of priority to U.S. provisional patent applications No. 60/162,735, filed Oct. 29, 1999, and No. 60/178,440, filed Jan. 27, 2000, and is a Continuation-in-Part of U.S. patent application Ser. No. 09/599,130, filed Jun. 22, 2000, which claims the benefit of U.S. provisional patent application No. 60/140,531, filed Jun. 23, 1999, and is a Continuation-in-Part of U.S. patent application Ser. No. 09/657,396, filed Sep. 8, 2000, each application of which is hereby incorporated by reference.

BACKGROUND OF THE INVENTION

1. Field of the Invention

The invention relates to a narrow band laser, and particularly to a high power excimer or molecular fluorine laser operating at a high repetition rate (e.g., 1–4 kHz or more).

2. Discussion of the Related Art

Semiconductor manufacturers are currently using deep ultraviolet (DUV) lithography tools based on KrF-excimer laser systems which emit around 248 nm and which will be followed by the next generation of ArF-excimer laser systems operating around 193 nm. Vacuum UV (VUV) lithography uses the molecular fluorine ($F_2$) laser operating around 157 nm.

Fabrication of integrated circuit devices of a quarter-micron or less, requires very fine photolithographic techniques. Bandwidths around 1.0 pm have been deemed sufficient for 248 nm lithography in the past. Today, it is desired to have an excimer or molecular fluorine laser with an output emission bandwidth of less than 0.6 pm and preferably less than 0.4 pm. It is specifically desired to have such a laser today emitting a laser beam with a bandwidth of less than 0.4 pm. Today's knowledge of derived bandwidth depends on wavelength, and the above is thus less than 0.4 pm for the 248 nm KrF laser, less than 0.3 pm for the 193 nm ArF laser, and less than 0.1 pm for the 157 nm $F_2$ laser.

To produce smaller features on silicon chips using the exposing radiation of a laser operating at the above-mentioned narrower bandwidth, e.g., less than around 0.6 pm, it is desired that the laser system exhibit greater absolute wavelength stability. For example, a laser output beam wavelength stability around or below 0.1 pm is desired.

Figures 1, 2A, 2B, 2C, 2D:
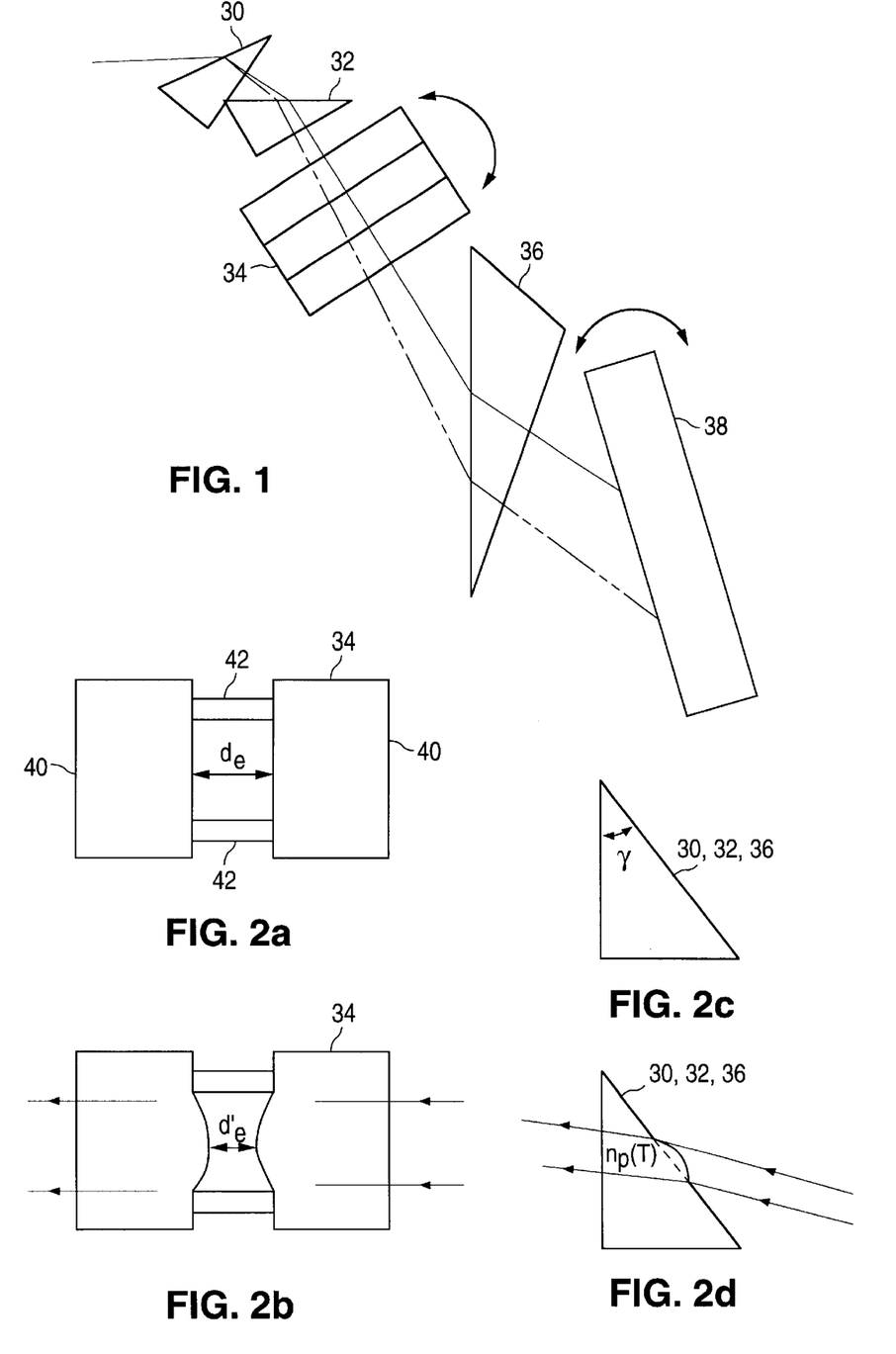
FIG. 1 schematically illustrates a line-narrowing module for a KrF excimer laser.
FIGS. 2a–2b illustrate how the gap spacing of an etalon changes as the etalon is heated due to absorption.
FIGS. 2c–2d illustrate how localized heating can distort the planarity of a prism surface.

A narrow band 248 nm lithography laser system operating at low power, e.g., less than 1 kHz, and having a bandwidth around 1 pm or more, includes within its resonator a line-narrowing module, such as that shown by example at FIG. 1 (see also, U.S. Pat. No. 5,150,370, which is hereby incorporated by reference). The line-narrowing module shown includes a prism beam expander including three prisms 30, 30 and 36, an etalon 34 and a grating 38. Each of the prisms 30, 32 and 36, and the plates of the etalon 34 of a line-narrowing module of a conventional KrF laser comprises fused silica due to its transparency at 248 nm. The wavelength stability is, however, substantially above 0.1 pm when the laser is operated at 1 kHz or higher power.

Line-narrowing modules vary in their response to the exposure to high power or high repetition rate laser beams that cause heating and aging of the optical components. For example, nonuniform heating of the optical elements of the line-narrowing module may substantially degrade their quality by, for example, disrupting the planarity of optical surfaces by localized expansion and causing fluctuations in the thermally dependent refractive index, thereby distorting the wavefront of the retroreflected or transmitted beam and detuning the wavelength. Wavefront distortions lead to changes in the output bandwidth of the laser system which is a parameter that it is desired to keep constant. Wavelength detuning may be compensated by rotating an optical element, typically the grating or HR mirror, as mentioned above. In addition to wavefront distortions and detuning, absorption by optical components results in reduced overall efficiency of the laser.

Parameters of the line-narrowing module that depend on the "quality" of the optical components such as the magnitude of angular dispersion, reflectivity for specific wavelengths, linearity (i.e., absence of wavefront distortions), scattering of the beam, etc., will thus affect the bandwidth, linewidth and overall performance of the laser. The quality of the optical components is generally tested by measuring the absorption of DUV (or VUV for $F_2$ lasers) radiation that leads to heating of the optical components and thermally induced distortions and defects.

It is desired to operate the laser at a higher repetition rate than is typical. For example, a conventional "low power" laser might operate at a repetition rate around 600 Hz. It is desired to have a laser operating above 1 kHz, and particularly around 2–4 kHz, or more. For 193 nm lasers, a repetition rate around 4 kHz will be used. To achieve sufficient throughput, the expectation for the molecular fluorine laser is to have a repetition rate greater than 4 kHz. At these repetition rates, greater laser power is incident on surfaces of optical components within the laser resonator that can serve to enhance the effects of thermally induced distortions or defects on the bandwidth of the laser.

It is desired to have a narrow band laser operating at high power and having a wavelength stability at or less than substantially 0.1 pm. In addition to KrF (248 nm) lasers, it is desired to have an efficient line-narrowing module for use with ArF (193 nm) and $F_2$ (157 nm) lasers.

SUMMARY OF THE INVENTION

It is therefore an object of the invention to provide a high power laser, i.e., 1–2 kHz or more, exhibiting a narrow bandwidth, such as is provided when a line-narrowing module including a prism beam expander and one or more etalons and/or a grating is included within the laser resonator, preferably less than 0.6 pm.

It is a further object of the invention that such high power narrow-band laser exhibit a wavelength stability of 0.1 pm or less.

The above objects are met by a laser including a gain medium surrounded by a resonator and including a line-narrowing module including a prism beam expander and one or more etalons and/or a grating or grism within the resonator. The material of transmissive portions of the line-narrowing module including the prisms and the plates of the etalons comprises a material having an absorption coefficient of less than $5 \times 10^{-3}$/cm at 248 nm incident radiation, less than $10 \times 10^{-3}$/cm at 193 nm incident radiation, and less than 0.1/cm at 157 nm. Preferably the material also has a thermal conductivity greater than 2.0 W/m° C. Preferably, that material is calcium fluoride ($CaF_2$).

INCORPORATION BY REFERENCE

What follows is a cite list of references each of which is, in addition to those references cited above and below, including that which is described as background, and in the priority section, and in the above invention summary, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

U.S. patent application Nos. 60/178,440, 60/167,835, 60/178,445, 09/317,695, 09/244,554, 09/317,527, 60/212,183, 09/594,892, 09/602,184, 09/599,130, 09/598,552, 09/629,256, 60/162,735, 60/166,277, 09/454,803, 60/170,919, 60/200,163, 60/212,257, 60/215,933 and 60/170,342, each of which is assigned to the same assignee as the present application;

U.S. Pat. Nos. 5,999,318, 5,970,082, 5,095,492, and 6,094,448;

European patent application No. EP 778,642 A2;

Japanese patent application No. 10-209533; and

E. G. Loewen, E. Popov, Diffraction Gratings and Applications 1997 (Marcel Dekker).

DETAILED DESCRIPTION OF THE PREFERRED EMBODIMENTS

It is recognized in the present invention that when inserted into a resonator of a narrow band laser operating at high power, e.g., 1–4 kHz or more, transmissive line-narrowing components of a conventional line-narrowing module including fused silica plates of conventional etalons, fused silica beam expanding or dispersive prisms and fused silica layers of diffraction gratings will absorb radiation at an undesirably high rate, causing these materials to heat up too much. The result of this increased absorption, which is greatly enhanced over that incurred components in low power systems, is surface distortion of surfaces of the prisms and grating, and greater fluctuation of the size of the etalon gap due to greater thermal expansion of surfaces of the etalon plates. This greater thermal expansion occurs when a same percentage (based on the absorption coefficient of the material of the surfaces such as those of the etalon plates) of the total number of incident photons is absorbed, but the total absorption is increased due to the increased number of incident photons per time interval from the high power, or higher repetition rate, laser, whether operating in burst or cw mode, over that of the conventional low power laser.

Referring again to FIG. 1, a line-narrowing module in shown particularly configured for use with a KrF laser. The line narrowing module includes a first beam expanding prism 30 and a second beam expanding prism 32, an etalon 34, and a third beam expanding prism 36 before a grating 38. The grating may be substituted by a highly reflective (HR) mirror. More or fewer than three prisms may be included, and two or more etalons or no etalon may be included. A dispersive prism or a grism may also be included (see U.S. patent applications No. 09/602,184 and 60/170,919, which are each assigned to the same assignee as the present application and are hereby incorporated by reference).

Each of the prisms 30, 32 and 36 serves to expand the beam, such that by the time the beam reaches the etalon 34 (prisms 30 and 32) and grating 38, the beam is expanded to encompass a larger portion of the etalon 34 and grating 38. The prisms 30, 32 and 36 expand the beam owing to their refractive nature. The index of refraction of each prism 30, 32 and 36 is in turn dependent on the temperature of the prism, particularly at the area on the surface of each prism 30, 32 and 36 that is impinged upon by the beam.

At those areas of the surfaces of the prism, as well as the volumes, of the prisms 30, 32 and 36, absorption occurs. The energy of the absorbed portion of the beam is converted to heat, and the index of refraction changes as the prism temperatures rise. The refractive index changes result in changes in the refraction angles of the beam at those surfaces. The solid and dashed lines shown in FIG. 1 illustrate how a ray of a certain wavelength travels along two different paths for two different temperature states of the prisms 30, 32 and 36. Other effects such as bandwidth broadening due to distortions of the planarity of the surfaces of the prisms 30, 32 and 36 are also induced by the temperature change.

At least two significant effects on the wavelength that will be reflected back out of the line-narrowing module occur. First, the angle at which rays traverse the gap spacing of the etalon 34 is changed. This changes the spectral positions of interference maxima according to:

$$2n_{gap}d_e \cos\theta = m\lambda \quad (1);$$

where $d_e$ is the etalon gap spacing, $n_{gap}$ is the temperature dependent index of refraction in the gap (not to be confused with $n_e(T)$ and $n_p(T)$ which are the indices of refraction of the material of the etalon plates and the prisms, respectively), and $\theta$ is the angle the ray makes with the planes of the etalon plates.

Second, the angle at which rays strike the grating 38 is changed. This changes the central wavelength reflected from the grating 38 back into the acceptance angle of the resonator according to:

$$2d_g \sin\psi = p\lambda \quad (2);$$

where $d_g$ is the groove spacing of the grating, $\psi$ is the blaze angle for a blazed echelle grating, and $\lambda$ is the wavelength reflected back at angle $\psi$.

It is therefore in accord with the objects of the invention above to provide prisms 30, 32 and 36 with greater thermal stability, such that the index of refraction $n_p(T)$ exhibits reduced variance caused by absorption of an incident high power laser beam. To achieve this object, fused silica may not be used because the absorption coefficient of fused silica is about $5.3\times10^{-3}$/cm for incident 248 nm radiation, and for 193 nm incident radiation, the absorption coefficient of fused silica is between 20-to-$30\times10^{-3}$/cm, which is too high permitting large temperature fluctuations and greater changes in $n_p(T)$ than would meet the objects of the invention. Instead, and advantageously, the absorption coefficient of the material of the prisms 30, 32 and 36 in accord with the preferred embodiment is less than $5\times10^{-3}$/cm at 248 nm incident radiation, less than $10\times10^{-3}$/cm at 193 nm incident radiation, and less than 0.1/cm at 157 nm. The preferred material meeting these specifications is calcium fluoride. Alternative materials may include $BaF_2$, LiF, $SrF_2$, fluorine-doped quartz and $MgF_2$, although $MgF_2$ is birefringent; generally a property of a material that is not preferred.

As shown in FIG. 1 by the arrows near the etalon 34 and grating 38, either or both of the etalon 34 and the grating 38 may be rotated to compensate the wavelength changes just described (see U.S. patent application No. 60/178,440, which is assigned to the same assignee as the present application and is hereby incorporated by reference). One or more of the prisms may also be rotated (see U.S. patent application Ser. No. 09/244,554, which is assigned to the same assignee as the present application and is hereby incorporated by reference).

FIGS. 2a–2f illustrate further changes that may be induced by the absorption of the higher power beam by the etalon 34, grating 38 and prisms 30, 32 and 36. FIG. 2a shows an etalon 34 such as may be used in the line-narrowing module as shown in FIG. 1 or FIGS. 3c–3e below, or in the line-narrowing resonator shown at FIG. 4, below. FIG. 2a shows an etalon before any thermally induced changes are incurred. The etalon 34 comprises two parallel plates 40 separated by a gap $d_e$. The etalon 34 has two spacers 42 typically comprising zerodur™, quartz, invar™ or Cordierite (see U.S. patent application No. 60/158,808, which is assigned to the same assignee as the present application and is hereby incorporated by reference).

FIG. 2b illustrates what happens to the etalon 34 when absorption occurs as a high power beam passes through the etalon 34. The surfaces of the plates that define the gap distort due to thermal expansion caused by absorption and changing the gap spacing to $d_e'$. The distortion is most pronounced where the absorption of the incident beam occurs which is the critical location in the gap determining the selected wavelength as understood from equation (1). This surface distortion serves to broaden the beam because the plates are less planar than those shown in FIG. 2b and a greater range of wavelengths are selected due to the spatial dependence of the gap spacing $d_e'$. In addition, the center wavelength in the interference spectrum as understood from equation (1) is also changed.

For the etalon 34, the greater expansion at the surface due to surface heating is followed by greater contraction of the plates during pauses between bursts when the laser is operated in burst mode. This phenomenon which may occur when an etalon 34 is in a high power laser resonator may be referred to as "breathing". Since the output emission wavelength of the narrow bandwidth laser system is determined by the gap spacing $d_e$ of the etalon 34, the result is reduced wavelength stability. Therefore, the etalon 34 of the preferred embodiment has plates 40 comprising a material with a reduced absorption coefficient.

It is also recognized that in addition to the absorption coefficient, the thermal conductivity of the material of the plates of the etalon 34 will effect its performance, particularly at high repetition rates. That is, incident laser radiation is absorbed in a localized region of the etalon plates 40 based on the size of the incident beam. It is this localized region that expands as it heats up effecting the etalon gap spacing and the output emission wavelength of the laser system. The absorbed energy will thermally diffuse away as phonons from this localized region at a rate that depends on the thermal conductivity of the material of the etalon plates 40. A material having a higher thermal conductivity would allow the heat to propagate to less critical portions of the etalon 34 away from the surfaces of the plates 40 upon which the high power beam impinges. Thus, if the etalon plates 40 comprise a material having a greater thermal conductivity, then the wavelength stability can be further improved.

The absorption coefficient of fused silica is about $5.3\times10^{-3}$/cm for incident 248 nm radiation. For 193 nm incident radiation, the absorption coefficient of fused silica is between $20$-to-$30\times10^{-3}$/cm. As described above, these absorption coefficients are larger than would meet the objects of the invention as they provide greater distortion than is tolerable when a high power laser beam is generated for microlithographic applications.

Advantageously, the absorption coefficient of the material of the plates of the etalon 34 in accord with the preferred embodiment is less than $5\times10^{-3}$/cm at 248 nm incident radiation, less than $10\times10^{-3}$/cm at 193 nm incident radiation, and less than 0.1/cm at 157 nm. The preferred material meeting these specifications is calcium fluoride ($CaF_2$). Alternative materials may include $BaF_2$, LiF, $SrF_2$, fluorine-doped quartz and $MgF_2$, although $MgF_2$ is birefringent; generally a property of a material that is not preferred, as mentioned above. The thermal conductivity of fused silica at 248 nm and 193 nm incident radiation is around 1.38 W/m° C. This thermal conductivity is too low such that energy of the beam absorbed and converted to heat cannot travel quickly enough away to less critical areas of the plates 40 of the etalon 34. Preferably, the material has a thermal conductivity greater than 2.0 W/m° C., and more preferably greater than 5.0 W/m° C. According also to this specification, the etalon plates 40 preferably comprise calcium fluoride $CaF_2$ to improve the thermal conductivity of the etalon 34 and reduce distortions at the critical location of the etalon plates 40 wherein the beam is incident.

FIG. 2c shows a beam expanding prism such as the prisms 30, 32 and 36 of FIG. 1. The discussion below is also relevant to a line-narrowing module including one or more dispersive prisms (see, e.g., U.S. Pat. No. 5,761,236, which is hereby incorporated by reference). The prism shown at FIG. 2c has an apex angle γ and smooth flat surfaces.

FIG. 2d shows how absorption of a high power laser beam causes the planarity of the surface of the prism 30, 32, or 36, or a dispersive prism, to distort. The distortion of the surface is caused by absorption of the energy of an incident high power beam such as an excimer or molecular fluorine laser operation at 1–4 kHz or more. The distortion causes an undesirable broadening of the bandwidth and geometry of the beam, in addition to the refractive angle changes described above based on the temperature dependent index of refraction $n_p(T)$. Directions of normals to the surface of the prism shown at FIG. 2d vary across the surface of the prism, particularly around the critical portion of the surface where the high power beam is incident. The angles of rays travelling within the prism thus vary depending on where those rays strike the distorted surface. This causes increased beam divergence, which is a parameter that the beam expanding prisms 30, 32 and 36 are inserted into the line-narrowing module to reduce. In addition, as the beam exits the prisms 30, 32 and 36 after impinging upon the grating 38 (see FIG. 1), rays of different wavelengths will cross over each other allowing some wavelengths that would ordinarily be outside the acceptance angle of the resonator to re-enter and broaden the overall bandwidth.

In order to reduce the distortion of the surfaces of the prisms 30, 32 and 36, a material is selected that has a lower coefficient of absorption, such as less than $5 \times 10^{-3}$/cm at 248 nm incident radiation, less than $10 \times 10^{-3}$/cm at 193 nm incident radiation, and less than 0.1/cm at 157 nm. In addition, the material preferably has a thermal conductivity greater than 2.0 W/m° C., and more preferably greater than 5.0 W/m° C., so that the heat is carried away from the critical region of the surfaces of the prisms more quickly. The preferred material meeting these specifications is calcium fluoride ($CaF_2$). Alternative materials may include $BaF_2$, LiF, $SrF_2$, fluorine-doped quartz and $MgF_2$, although $MgF_2$ is birefringent; generally a property of a material that is not preferred, as mentioned above.

Figure 2E:
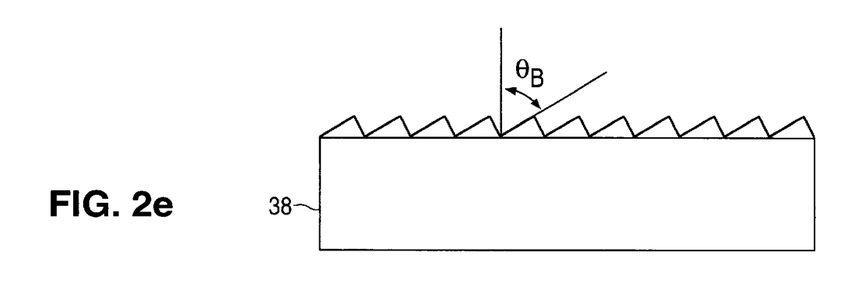
FIGS. 2e–2f illustrate how absorption of laser radiation can distort the surface contour of a grating.
Figure 2F:
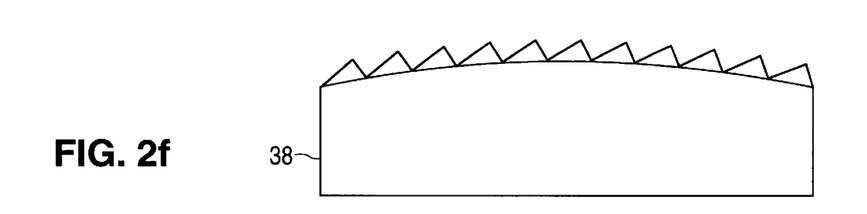

FIGS. 2f and 2g illustrate how a thermally induced curvature of the grating may also be effected by an incident high power laser beam. The grating of FIG. 2f is shown prior to being hit by a high power laser beam. The preferred grating has a blazed structure such as for a typical eschelle grating, or more preferably, such as the grating shown and described in either or both of U.S. patent applications Nos. 60/170,342 and 60/167,835, each of which is assigned to the same assignee and is hereby incorporated by reference (see also U.S. Pat. No. 5,999,318, which is hereby incorporated by reference). Undesirable effects on the wavelength may be caused if thermally induced distortions of the surface contour of the grating such as shown in FIG. 2f are caused by an incident high power beam. A preferred grating is generally described in the '835 application, wherein the blazed rulings of the preferred grating are etched directly into the substrate of the grating, rather than being formed in a separate layer and then adhered to onto the substrate.

Figure 3A:
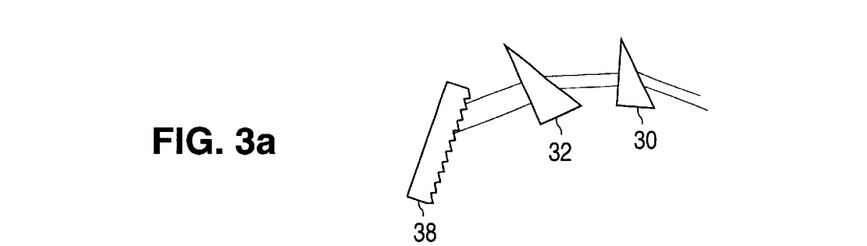
FIGS. 3a–3e schematically illustrate further line-narrowing module configurations, in addition to that shown at FIG. 1, according to preferred embodiments.

FIGS. 3a–3e show some alternative configurations of line-narrowing modules that would benefit by incorporating one or more etalons 34, 35 and/or prisms 30, 32 and/or a grating 38 according the preferred embodiments described above. FIG. 3a schematically shows a line-narrowing module for use with a line-narrowed laser system according to a preferred embodiment including a prism beam expander 30, 32 and a diffraction grating 38 arranged in a Littrow configuration. The beam expander 30, 32 may include the two prisms shown, or may includes only one prism or more than two prisms. For example, a line-narrowing module for an ArF laser preferably includes four prisms. The beam expander 30, 32 serves to reduce divergence of the beam incident onto the grating 38, thus improving wavelength resolution of the wavelength selector.

The grating 38 is preferably as described above, or is a high blaze angle echelle grating such as is described at the No. 60/170,342 application, incorporated by reference above. An aperture (not shown) may be included preferably before the beam expander prism 30 to reject stray light and reduce broadband background, and can also serve to reduce the linewidth of the beam by lowering the acceptance angle of the resonator. Exemplary apertures are set forth at U.S. Pat. No. 5,161,238, which is assigned to the same assignee and is hereby incorporated by reference (see also the Ser. No. 09/130,277 application incorporated by reference above).

Figure 3B:
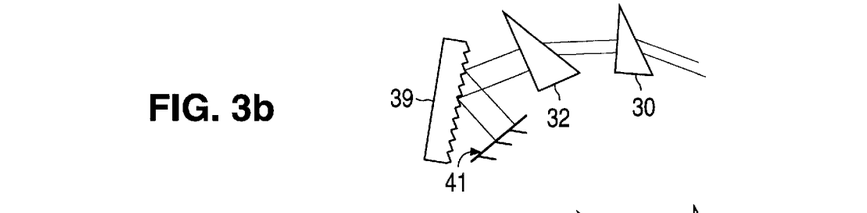

The system of FIG. 3b includes the beam expander 30, 32 described above with respect to FIG. 3a, and also includes a diffraction grating 39 and a highly reflective mirror 41. The grating 39 preferably differs from the grating 38 of FIG. 3a either in its orientation with respect to the beam, or its configuration such as its blaze angle, etc., or both. The laser beam is incident onto the grating 39 at an angle closer to 90° than for the grating 38. The incidence angle is, in fact, preferably very close to 90°. This arrangement is referred to as the Littman configuration. The Littman configuration serves to increase the wavelength dispersion of the grating 39. The positions of the grating 39 and mirror 41 may be reversed, as well, such as is described at U.S. Pat. No. 5,970,082, which is hereby incorporated by reference. After passing through (for a transmission grating, not specifically shown) or reflecting from the diffraction grating 39, the diffracted beam is reflected by the highly reflective mirror 41. The tuning of the wavelength is preferably achieved by tilting the highly reflective mirror 41. Tuning may be achieved otherwise by rotating another optic or by pressure tuning one or more optics, or otherwise as described below, or as may be understood by one skilled in the art.

Figure 3C:
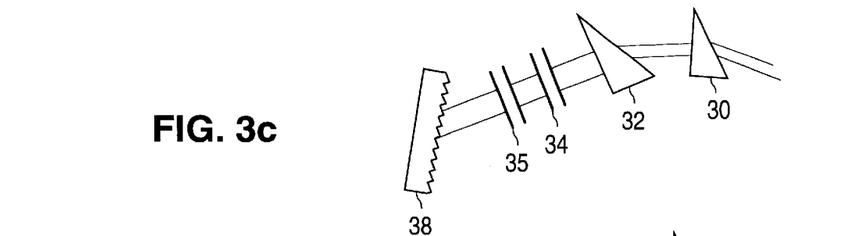

FIG. 3c schematically shows another embodiment including beam expanding prisms 30, 32 and Littrow diffraction grating 38, preferably as described above. In addition, the system of FIG. 3c includes one or more etalons 34, 35, e.g, two etalons are shown, which provide high-resolution line narrowing, while the grating 38 serves to select a single interference order of the etalons 34, 35. The etalon or etalons 34, 35 may be placed in various positions in the resonator, i.e., other than as shown. For example, a prism or prisms of the beam expander 30 may be positioned between an etalon or etalons 34, 35 and the grating 38. An etalon may also be used as an output coupler, as will be described in more detail below with reference to FIG. 4a. The arrangement of FIG. 3c (as well as FIGS. 3d and 3e below) including an etalon or etalons 34, 35 may be varied as described at any of U.S. patent applications Nos. 60/162,735, 60/178,445, 60/212, 183, 09/657,396 or 60/158,808, each of which is assigned to the same assignee and is hereby incorporated by reference.

Figure 3D:
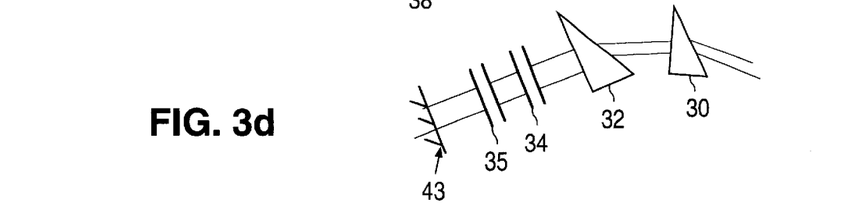

FIG. 3d shows another embodiment of the laser system having one or more etalons 34, 35, e.g., two etalons are shown. The system of FIG. 3d is the same as that of FIG. 3c except that the grating 38 of FIG. 3c is replaced with a highly reflective mirror 43 in the embodiment of FIG. 3d, and the etalons 34, 35 are differently configured owing to the omission of the grating 38 which is not available, as in the system of FIG. 3c, to select a single interference order of the etalons 34, 35. The free spectral ranges of etalons 34, 35 are instead adjusted in such a way that one of the etalons 34 or 35, preferably the first etalon 34 after the beam expanding prism 32, selects a single order of the other etalon 35, e.g., the second etalon 35. The second etalon 35 of the preferred arrangement is, therefore, allowed to have a smaller free spectral range and higher wavelength resolution. Some further alternative variations of the etalons 34, 35 of the system of FIG. 3d may be used as set forth in U.S. Pat. No. 4,856,018, which is hereby incorporated by reference.

Figure 3E:
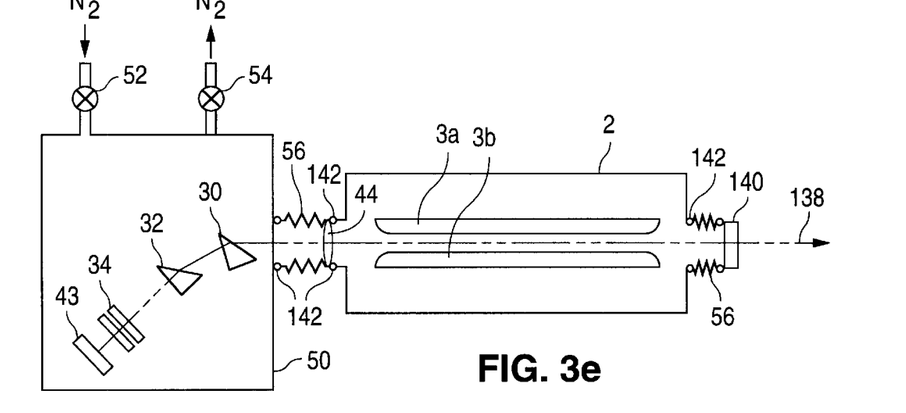

FIG. 3e shows a seventh preferred embodiment of a resonator arrangement for a molecular fluorine (F2) laser including a line-narrowing module 50 having a prism beam expander 46 and an etalon 48 for line selection and/or line narrowing. The resonator arrangement of the seventh embodiment includes a discharge chamber 2 filled with a gas mixture including molecular fluorine and one or more buffer gases such as neon and/or helium. A pair of main discharge electrodes 3a, 3b are in the discharge chamber and connected to a pulser circuit (not shown) for energizing the molecular fluorine. One or more preionization units is also within the discharge chamber (not shown, but see the No. 60/162,845 application, mentioned above). Other aspects of the discharge chamber 2 may be found at the Ser. No. 09/453,670 application and otherwise as set forth above and/or as understood by those skilled in the art.

One window 140 is a piano-parallel optical window which serves as an outcoupler. A partially reflective mirror may alternatively be used separate from the chamber window 140 for outcoupling the beam, and the window 140 serving the dual role of sealing the chamber 2 and outcoupling the beam reduces the number of optical surfaces within the resonator and thereby enhancing its efficiency. The window 140 is preferably aligned perpendicular to the optical axis, but may be oriented at an angle such as 5° or at Brewster's angle or another selected angle for achieving desired reflectivity and transmissivity characteristics and/or to prevent parasitic oscillations.

Vacuum bellow 56 or similar arrangement provides versatility in degrees of freedom of adjustment and a vacuum-tight seal. The other window 44 is preferably a piano-convex lens serving to compensate the wavefront curvature as described in U.S. Pat. No. 6,061,382 and European Patent Application EP 00955706 A1, each of which is assigned to the same assignee and is hereby incorporated by reference. Tightness of the seal is ensured by seals 42. The lens 44 may or may not be adjustable. The lens 44 may be tilted slightly off the normal to the beam (e.g., 5° or so) in order to avoid parasitic oscillations. Preferably, this lens 44 is anti-reflectively coated.

The resonator of an $F_2$-laser according to a preferred embodiment is shown at FIG. 3e including a preferred line-selection and/or line-narrowing unit coupled with a discharge chamber 2 via bellows 56 and seals 142. The beam is preferably expanded by one or more beam expansion prisms 30, 32, preferably as described above, in order to reduce its divergency. Several prisms 30, 32 and/or 36 (see FIG. 1) may be used, e.g., four prisms are preferred for the ArF laser and FIG. 1 sets forth a preferred KrF laser arrangement, and alternatively, a converging diverging lens pair may be used or other beam expansion means known to those skilled in the art.

A transmissive etalon 34 is preferably positioned after the beam expander prisms 30, 32 and serves as a wavelength selector. Finally, highly reflecting mirror 43 returns the beam back through the resonator. The line-narrowing unit is within an enclosure 50 that is coupled to the laser chamber 2 using a bellows 56 and seals 142 such that the line-narrowing unit of the laser resonator is sealed from the outer atmosphere. An inert purge gas is flowed through the enclosure 50 via inert and outlet ports 52, 54. A vacuum port may be included or a pump can be connected via either port 52 or 54.

A method for controlling the atmosphere in the enclosure may be to maintain the enclosure under evacuated conditions using a pump, or to flow the purge gas rapidly through the enclosure 50, or preferably to first evacuate the enclosure and then to flow the purge gas at a low flow rate. An evacuation may be followed by a backfill of the purge gas and the procedure may be repeated a number of times, e.g., 3–10 times, before the purge gas is flowed at a low rate. For more details and alternative procedures for preparing and maintaining the atmosphere of the enclosure, see U.S. patent applications Ser. No. 09/343,333, 09/594,892 and 09/598,522, each of which is assigned to the same assignee as the present application and is hereby incorporated by reference (relating to an enclosure for a beam delivery path and diagnostic beam splitter module for an F2-laser).

The entire beam path between the chamber 2 and the highly reflective mirror 43 is in fact preferably enclosed within the enclosure 50 which is purged with some inert gas such as preferably nitrogen, or helium, argon, krypton or the like. High purity nitrogen is preferably used for this purpose.

The pressure of the nitrogen in the enclosure 50 may be adjustable, and by changing the pressure of nitrogen, one can adjust the transmission spectrum of the etalon 34 (see, e.g., U.S. patent application Ser. No. 09/178,445, relating to pressure tuning a line-narrowing unit including a grating and beam expander, which is assigned to the same assignee and is hereby incorporated by reference). The maximum of transmission of the etalon 34 is preferably adjusted to coincide with a maximum in the primary line at $\lambda_1$ around 157.62 nm, among multiple lines around 157 nm including also a secondary line $\lambda_2$ around 157.52 nm which is preferably suppressed, of the natural emission spectrum of the free-running $F_2$ laser.

Figure 4A:
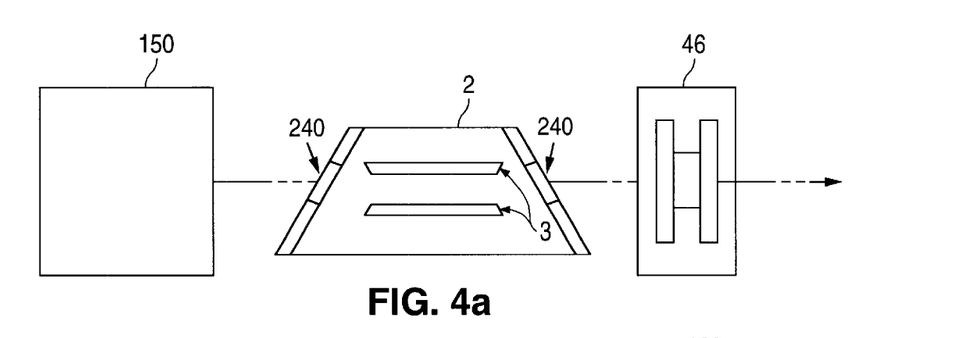
FIG. 4 schematically illustrates a line-narrowing resonator in accord with a further preferred embodiment.

The etalon 48 may be tuned piezo-electrically, rotationally and/or by adjusting the pressure within the gap between its plates. One way of varying the pressure is to control intake and escape rates of the nitrogen purge gas shown at FIG. 3e using needle valves 52 and 54. Closing output valve 54 and/or opening inlet valve 52, e.g., causes the pressure to rise, and visa versa. Variations of the embodiment of FIG. 3e may include having an outcoupler as a separate optical element from the window 140, with the output window 140 of the chamber 2 being a plano-plano window. This provides an opportunity to mount resonator optics onto a mechanically stable structure, decoupled from the chamber 2. However, this increases optical losses and reduces the efficiency of the laser. A second etalon 35, a grating 38 or 39 and/or one or more dispersive prisms may be included with the line-narrowing unit of FIG. 3e. The etalon 34 may be replaced with a reflective etalon to serve a dual role as a line selection element and as a resonator reflector, such as a high finesse etalon.

The laser oscillator of FIG. 3e typically produces lower output power, as compared to a free-running $F_2$ laser resonator. Therefore, an amplifier may be used in this embodiment, as well as with any of the line-narrowing module embodiments described herein particularly for the $F_2$ laser, such as is described at U.S. patent application Ser. No. 09/599,130, which is assigned to the same assignee as the present application and is hereby incorporated by reference.

FIG. 4a schematically shows an embodiment that is a variation of any of the arrangements described above with reference to FIGS. 1 and 3a–3e, respectively. The line-narrowing modules shown and described in those embodiments also have included for additional line-narrowing and/or line selection in laser resonators which include them in this embodiment, a reflective etalon outcoupler 46 which replaces the partially reflecting outcoupler mirror typically otherwise included in their resonators. The etalon outcoupler 46 may be used in combination with the grating 38 or 39 and beam expander 30, 32 of FIGS. 1 and 3a–3e, respectively, wherein the grating 38 or 39 selects a single interference order of the etalon outcoupler 46. Alternatively, one or more dispersive prisms or another etalon may be used in combination with the etalon outcoupler 46 for selecting a single interference order of the etalon 46. The grating 38 or 39 restricts the wavelength range to a single interference order of the outcoupler etalon 46.

Variations of the systems of FIGS. 1 and 3a–3e that may be used in combination with the systems set forth at FIG. 4a are set forth at the U.S. patent applications Ser. No. 09/317, 527 and 60/166,277, each of which is assigned to the same assignee, and U.S. patents Nos. 6,028,879, 3,609,586, 3,471, 800, 3,546,622, 5,901,163, 5,856,991, 5,440,574, and 5,479, 431, and H. Lengfellner, Generation of tunable pulsed microwave radiation by nonlinear interaction of Nd:YAG laser radiation in GaP crystals, Optics Letters, Vol. 12, No. 3 (March 1987), S. Marcus, Cavity dumping and coupling modulation of an etalon-coupled CO2 laser, J. Appl. Phys., Vol. 53, No. 9 (September 1982), and The physics and technology of laser resonators, eds. D. R. Hall and P. E. Jackson, at p. 244, and Japanese patent publications No. 3-82183, 1-179477, 44-8147, 62-160783, 2-152,288, 8-274, 399, and 63-45875, each of which is hereby incorporated by reference.

In all of the above embodiments shown and described with reference to FIGS. 1, 3a–3e and 4a, the material used for the prisms of the beam expanders 30, 32, 36, etalons 34, 35, 46 and also for the laser windows 140, 240 is preferably one that is highly transparent at DUV and/or VUV emission wavelengths of the KrF, ArF and/or $F_2$ laser at 248 nm, 193 nm and 157 nm, respectively, with which the line-narrowing optics are being used. The materials are also capable of withstanding long-term exposure to ultraviolet light with minimal degradation effects.

For the reasons set forth in detail above with particular reference to FIGS. 2a–2d, and in accord with the objects of the invention, the material of the transmissive optical components of the line-narrowing module including the prisms and the plates of the etalons advantageously comprises a material having an absorption coefficient of less than $5\times10^{-3}$/cm at 248 nm incident radiation, less than $10\times10^{-3}$/cm at 193 nm incident radiation, and less than 0.1/cm at 157 nm. Preferably the material also has a thermal conductivity greater than 2.0 W/m° C. Preferably, that material is calcium fluoride ($CaF_2$). Other materials may include $BaF_2$, LiF, $MgF_2$, fluorine-doped quartz and $SrF_2$. Also, in all of the above embodiments of FIGS. 2a–2f, many optical surfaces, particularly those of the prisms, preferably have an anti-reflective coating on one or more optical surfaces, in order to minimize reflection losses and prolong their lifetime.

In general, a line-narrowing module in accord with the preferred embodiment will have beam expanding prisms and/or one or more etalons as the only transmissive optical components; the grating 38, 39 and HR mirror 43, if included, being reflective components. In alternative embodiments, a transmission grating or a partially or fully transmissive grism may be included in the resonator. Other transmissive optical components within the laser resonator and also subject to heat induced distortions, as described above, include the windows on the laser chamber and may include portions of the front optics module located on the other side of the discharge chamber as the line-narrowing module described above (one such component may include the etalon outcoupler 46 of FIG. 4a or the birefringent or partially birefringent outcoupler described with respect to FIGS. 4b–4c, below. These other components can undergo thermally induced distortions, as well as the prisms and etalon(s), although they do not produce effects on the beam bandwidth and wavelength stability as drastic as those described above.

Thermally induced distortions may for each of these optical components, and particularly the etalon(s) and prism (s), are advantageously reduced in accord with the preferred embodiments, where in the line-narrowing module, and preferably the entire excimer or molecular fluorine laser resonator, each of the transmissive or substantially transmissve components is comprised of a material having an absorption coefficient that is less than $5\times10^{-3}$/cm at 248 nm incident radiation, less than $10\times10^{-3}$/cm at 193 nm incident radiation, and less than 0.1/cm at 157 nm, and preferably also having a thermal conductivity greater than 2.0 W/m° C., and more preferably greater than 5.0 W/m° C. The preferred material meeting these specifications is, in general and subject to the discussion below with respect to FIGS. 4b–4c, calcium fluoride ($CaF_2$), and alternative materials may include $BaF_2$, LiF, $SrF_2$, fluorine-doped quartz and $MgF_2$. By substantially transmissive, it is meant that a reflection grating would not be substantially transmissive. A grism having a reflective coating on a surface for high reflection or partial reflection of the beam would be substantially transmissive. The plates of an etalon output coupler 46 and the blocks 130, 136 described below would also represent substantially transmissive optics.

Figure 4B:
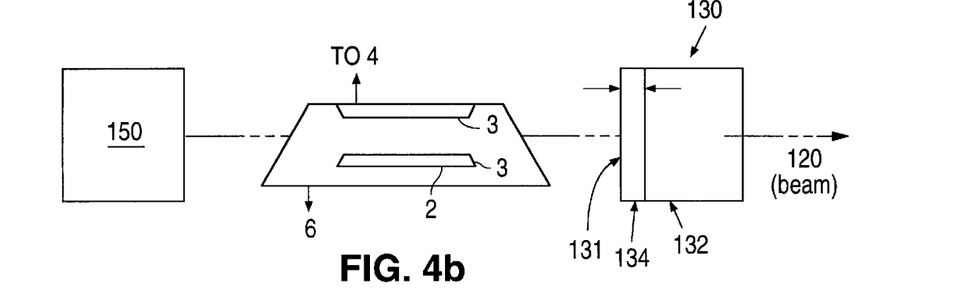
Figure 4C:
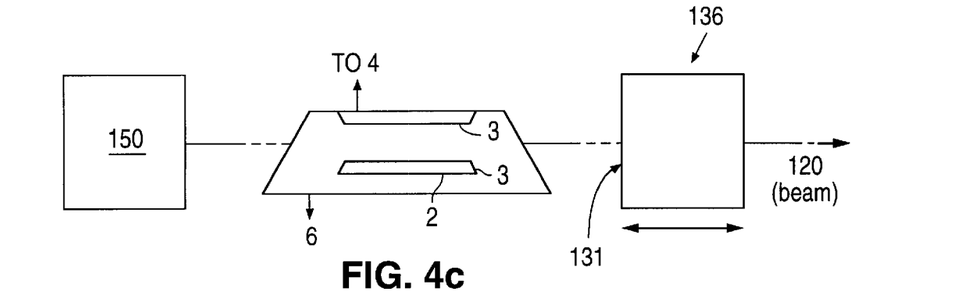

FIGS. 4b–4c show resonator arrangements in accord with a first of two additional embodiments, particularly suited for the $F_2$ laser. In FIG. 4b, the resonator includes the discharge chamber 2 preferably configured as set forth above, e.g., having a pair of elongated main electrodes 3 and a preionization unit (not shown), and being connected to a pulser circuit 4 and gas supply system 6 (see below). The resonator of FIG. 4b further includes a rear optics module 150 including a line-selection package such as has been described above.

Although many line-selection packages are possible, a line-selection package that does not considerably extend the resonator length, such as by using too many prisms in the beam expander, or simply by using the prism-grating combination, or a combination having more than one dispersive prism, whereby the rear optics module becomes a large extension of the overall resonator package, may be used in the embodiments of FIGS. 4b–4c. An alternative to the rear optics module 150 is to provide the line-selection component or components in contact with or in a housing connected to the discharge chamber 2 or laser tube atmosphere (see U.S. patent application Ser. No. 09/317,695, which is assigned to the same assignee and is hereby incorporated by reference).

Any of these alternative embodiments of the line-selection package at the opposite side of the resonator as the outcoupler may be advantageously combined with the output coupler 130 of FIG. 4b (or the output coupler 136 of FIG. 4c, below). That is, the line-selection package of the rear optics module 150 (or as set forth in the '695 application), improves the contrast ratio to perhaps 20–100, which is advantageous over the characteristic contrast ratio of 7. However, the output coupler 130 provides a still higher contrast ratio, e.g., above 100 and perhaps as high as 500 or above.

Line narrowing optics (not shown) may be included within the resonator on the outcoupling side of the chamber 2, such as in the front optics module as set forth in U.S. patent application Nos. 60/166,967, 60/166,277 and 60/173,993, each of which is assigned to the same assignee, and in U.S. Pat. No. 5,852,627, each of which is hereby incorporated by reference. When these line-narrowing optics, or variations thereof as understood by one skilled in the art, are used, careful additional beam steering means are used for aligning the optics with the rest of the resonator. This beam steering implies losses, and so it is preferred to use an amplifier after the outcoupler in this embodiment to increase the power of the beam (see the No. 60/140,531 application, incorporated by reference above).

The outcoupler of the embodiment of FIG. 4b generally has a periodic transmission function having a maximum at or near $\lambda_1$ (see above for the $F_2$ laser) and a minimum at or near $\lambda_2$. As such, the preferred outcoupler, and those shown at FIGS. 4b and 4c, i.e., outcouplers 130 and 136, has a partially reflecting surface 31 which serves as a resonator reflector of the resonator. An alternative would be that the partially reflecting resonator reflector surface is formed after the line-selection providing portion such as at the back surface of the outcoupler 130 or 136, or as provided by an etalon outcoupler 46 (see FIG. 4a), and the outcoupler has a reflectivity maximum at or near $\lambda_1$ and a minimum at or near $\lambda_2$. The transmission function embodiment is, however, preferred since it is the radiation that outcouples directly from the chamber 2, without traversing the rear optics line-selection package 150, in which it is preferred to suppress $\lambda_2$. The outcoupler 130 is preferably made of a block of VUV transparent material 132 such as $CaF_2$ or one of those other preferred materials mentioned above with advantageous absorption and thermal conductivity characteristics. The material block 132 has a special coating 134 formed on it. The coating 134 is preferably highly compounded with the block 132. Advantageously, a preferred thickness of the coating 132 between 30 to 50 microns may be, in this way, more easily manufacturable than, e.g., the etalon outcoupler 46, described above. An etalon-like interference effect is produced by the outcoupler 130 having the coating 132 to perform efficient wavelength selection. That is, the block 132 with the coating 134 provides the advantageous transmission function described above. Preferably the coating is made of $MgF_2$.

FIG. 4c shows a second embodiment including the discharge chamber 2 and line-selection elements 150 preferably as set forth above, and an outcoupler 136. The outcoupler 136 has a partially reflective surface 131 forming the resonator reflector of the resonator, as in the embodiment of FIG. 4b. The outcoupler 136 is advantageously formed of $MgF_2$ which provides the periodic transmission function for suppressing the secondary line $\lambda_2$ and improving the contrast ratio. The small refractive index difference between the ordinary and extraordinary polarizations $n_o$ and $n_e$, respectively, of the $MgF_2$, owing to its birefringent nature, is small enough (i.e., around 0.014) that the material thickness of the outcoupler 136 is of the order of several millimeters. Preferably, the thickness is around 8.4 mm for producing the desired line-selective transmission.

As set forth above with reference to FIG. 4b, the outcoupler 136 forms a highly stable, highly transparent and compact outcoupler. That is, the contrast ratio is advantageously increased for the two characteristic emission lines of the $F_2$ laser, particularly due to the suppression of the radiation generated in the chamber 2 and being directly outcoupled without traversing the rear module 150.

Excimer or Molecular Fluorine Laser System

Figure 5:
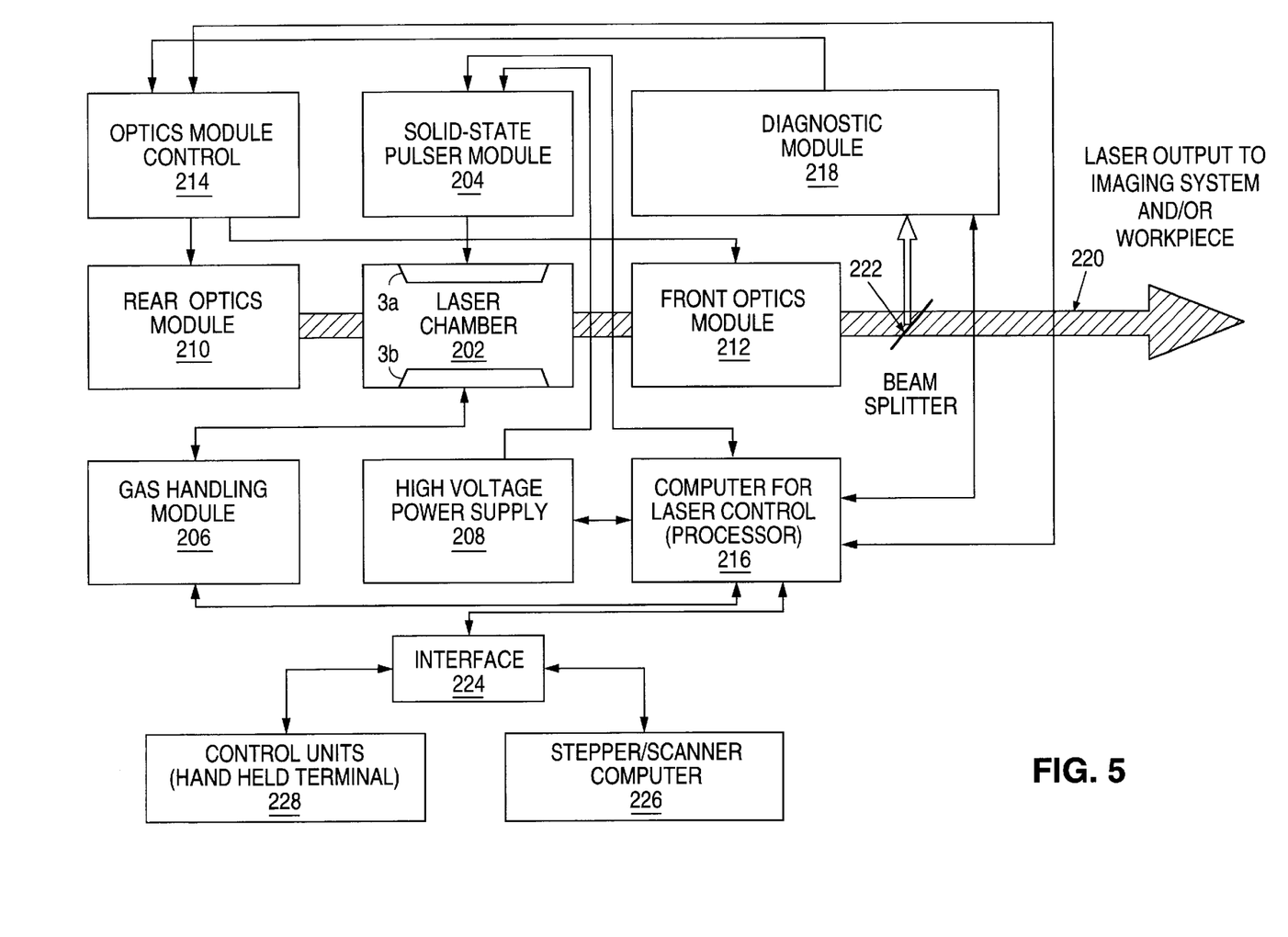
FIG. 5 schematically shows an excimer or molecular fluorine laser system according to a preferred embodiment.

The details of the laser resonator, and particularly relating to the line-narrowing and/or selection optics, described above, of the preferred embodiments, may be advantageously used to achieve an excimer or molecular fluorine laser for such industrial applications as microlithography, TFT annealing and micromachining. Referring to FIG. 5, a gas discharge laser system, preferably a DUV or VUV laser system, such as an excimer, e.g., ArF or KrF, or molecular fluorine ($F_2$) laser system for deep ultraviolet (DUV) or vacuum ultraviolet (VUV) lithography, is schematically shown. Alternative configurations for laser systems for use in such other industrial applications as TFT annealing and/or micromachining, e.g., are understood by one skilled in the art as being similar to and/or modified from the system shown in FIG. 5 to meet the requirements of that application. For this purpose, alternative DUV or VUV laser system and component configurations are described at U.S. patent application Ser. Nos. 09/317,695, 09/317,526, 09/130,277, 09/244,554, 09/452,353, 09/317,527, 09/343,333, 60/122, 145, 60/140,531, 60/162,735, 60/166,952, 60/171,172, 60/141,678, 60/173,993, 60/166,967, 60/147,219, 60/170, 342, 60/162,735, 60/178,445, 60/166,277, 60/167,835, 60/171,919, 60/202,564, 60/204,095, 60/172,674, 09/574, 921 and 60/181,156, and U.S. Pat. Nos. 6,005,880, 6,061, 382, 6,020,723, 5,946,337, 6,014,206, 5,559,816, 4,611,270, 5,761,236, each of which is assigned to the same assignee as the present application and is hereby incorporated by reference.

The system shown in FIG. 5 generally includes a laser chamber 202 having a pair of main discharge electrodes 3a, 3b connected with a solid-state pulser module 204, and a gas handling module 206. The solid-state pulser module 204 is powered by a high voltage power supply 208. The laser chamber 202 is surrounded by optics module 210 and optics module 212, forming a resonator. The optics modules 210 and 212 are controlled by an optics control module 214, or may be alternatively directly controlled by a computer 216.

The computer 216 for laser control receives various inputs and controls various operating parameters of the system. A diagnostic module 218 receives and measures one or more parameters of a split off portion of the main beam 220 via optics for deflecting a small portion of the beam toward the module 218, such as preferably a beam splitter module 222, as shown. The beam 220 is preferably the laser output to an imaging system (not shown) and ultimately to a workpiece (also not shown), and may be output directly to an application process. The laser control computer 216 communicates through an interface 224 with a stepper/scanner computer 226 and other control units 228.

Laser Chamber

The laser chamber 202 contains a laser gas mixture and includes one or more preionization electrodes (not shown) in addition to the pair of main discharge electrodes 3a, 3b. Preferred main electrodes 3a, 3b are described at U.S. patent application Ser. Nos. 09/453,670, 60/184,705 and 60/128, 227, each of which is assigned to the same assignee as the present application and is hereby incorporated by reference. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are described at U.S. patent application Nos. 60/162,845, 60/160,182, 60/127,237, 09/535,276 and 09/247,887, each of which is assigned to the same assignee as the present application, and alternative embodiments are set forth at U.S. Pat. Nos. 5,337,330, 5,818,865 and 5,991, 324, all of the above patents and patent applications being hereby incorporated by reference.

Power Supply Circuit and Pulser Module

The solid-state pulser module 204 and high voltage power supply 208 supply electrical energy in compressed electrical pulses to the preionization and main electrodes 3a, 3b within the laser chamber 202 to energize the gas mixture. Components of the preferred pulser module and high voltage power supply may be described at U.S. patent application Nos. 60/149,392, 60/198,058, 60/204,095, 09/432,348 and 09/390,146, and 60/204,095, and U.S. Pat. Nos. 6,005,880 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872 and 5,729,562, each of which is hereby incorporated by reference. A conventional pulser module may generate electrical pulses in excess of 1 Joule of electrical power (see the '988 patent, mentioned above).

Laser Resonator, General

Several laser resonator configurations may be arranged in accord with the preferred embodiments set forth above. In general, the laser resonator which surrounds the laser chamber 202 containing the laser gas mixture includes optics module 210 including line-narrowing optics for a line narrowed excimer or molecular fluorine laser, which may be replaced by a high reflectivity mirror or the like in a laser system wherein either line-narrowing is not desired, or if line narrowing is performed at the front optics module 212, or a spectral filter external to the resonator is used, or if the line-narrowing optics are disposed in front of the HR mirror, for narrowing the linewidth of the output beam.

The laser chamber 202 is sealed by windows transparent to the wavelengths of the emitted laser radiation 220. The windows may be Brewster windows or may be aligned at another angle, e.g., 5°, to the optical path of the resonating beam. One of the windows may also serve to output couple the beam.

Extra-Resonator Features

After a portion of the output beam 220 passes the outcoupler of the optics module 212, that output portion impinges upon beam splitter module 222 which includes optics for deflecting a portion of the beam to the diagnostic module 218, or otherwise allowing a small portion of the outcoupled beam to reach the diagnostic module 218, while a main beam portion 220 is allowed to continue as the output beam 220 of the laser system. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 218. A holographic beam sampler, transmission grating, partially transmissive reflection diffraction grating, grism, prism or other refractive, dispersive and/or transmissive optic or optics may also be used to separate a small beam portion from the main beam 220 for detection at the diagnostic module 218, while allowing most of the main beam 220 to reach an application process directly or via an imaging system or otherwise.

The output beam 220 may be transmitted at the beam splitter module 222 while a reflected beam portion is directed at the diagnostic module 218, or the main beam 220 may be reflected, while a small portion is transmitted to the diagnostic module 218. The portion of the outcoupled beam which continues past the beam splitter module 222 is the output beam 220 of the laser, which propagates toward an industrial or experimental application such as an imaging system and workpiece for photolithographic applications. Variations of beam splitter modules 222 particularly for a molecular fluorine laser system are set forth at U.S. patent application Ser. Nos. 09/598,552 and 60/140,530, which are each assigned to the same assignee as the present application and are hereby incorporated by reference.

Beam Path Enclosure

Also particularly for the molecular fluorine laser system, and for the ArF laser system, an enclosure (not shown, but see FIG. 3e, e.g.) may seal the beam path of the beam 220 such as to keep the beam path free of photoabsorbing species. Smaller enclosures may seal the beam path between the chamber 202 and the optics modules 210 and 212 and between the beam splitter module 222, which itself may be within the same or a separate enclosure, and the diagnostic module 218. The preferred enclosure is described in detail in U.S. patent application Ser. Nos. 09/343,333, 09/598,552, 09/594,892, 09/131,580 and 60/140,530, each of which is assigned to the same assignee and is hereby incorporated by reference, and U.S. Pat. Nos. 5,559,584, 5,221,823, 5,763,855, 5,811,753 and 4,616,908, all of which are hereby incorporated by reference, and as set forth above with respect to FIG. 3e.

Diagnostic Module

The diagnostic module 218 preferably includes at least one energy detector. This detector measures the total energy of the beam portion that corresponds directly to the energy of the output beam 220 (see U.S. Pat. No. 4,611,270 and U.S. patent application Ser. No. 09/379,034, each of which is assigned to the same assignee and is hereby incorporated by reference. An optical configuration such as an optical attenuator, e.g., a plate or a coating, or other optics may be formed on or near the detector or beam splitter module 222 to control the intensity, spectral distribution and/or other parameters of the radiation impinging upon the detector (see U.S. patent application Ser. Nos. 09/172,805, 60/172,749, 60/166,952 and 60/178,620, each of which is assigned to the same assignee as the present application and is hereby incorporated by reference).

One other component of the diagnostic module 218 is preferably a wavelength and/or bandwidth detection component such as a monitor etalon or grating spectrometer (see U.S. patent application Nos. 09/416,344, 60/186,003, 60/158,808, 60/186,096, 60/186,096 and 60/186,096 and 60/202,564, each of which is assigned to the same assignee as the present application, and U.S. Pat. Nos. 4,905,243, 5,978,391, 5,450,207, 4,926,428, 5,748,346, 5,025,445, and 5,978,394, all of the above wavelength and/or bandwidth detection and monitoring components being hereby incorporated by reference. The spectrometer may be within a temperature and pressure controlled housing such as is described in the No. 60/158,808 application.

Other components of the diagnostic module may include a pulse shape detector or ASE detector, such as are described at U.S. patent application Ser. Nos. 09/484,818 and 09/418,052, respectively, each of which is assigned to the same assignee as the present application and is hereby incorporated by reference, such as for gas control and/or output beam energy stabilization, or to monitor the amount of amplified spontaneous emission (ASE) within the beam to ensure that the ASE remains below a predetermined level, as set forth in more detail below. There may be a beam alignment monitor, e.g., such as is described at U.S. Pat. No. 6,014,206 which is assigned to the same assignee and is hereby incorporated by reference.

Control Processor

The processor or control computer 216 receives and processes values of some of the pulse shape, energy, ASE, energy stability, energy overshoot for burst mode operation, wavelength, spectral purity and/or bandwidth, among other input or output parameters of the laser system and output beam. The processor 216 also controls the line narrowing module to tune the wavelength and/or bandwidth or spectral purity, and controls the power supply and pulser module 204 and 208 to control preferably the moving average pulse power or energy, such that the energy dose at points on the workpiece is stabilized around a desired value. In addition, the computer 216 controls the gas handling module 206 which includes gas supply valves connected to various gas sources.

Further details of the control processor 216 such as for performing burst overshoot control and controlling the gas supply unit by monitoring total input energy to the discharge, among other paramters, for determining the timing and amounts of gas replenishment actions, are described at U.S. patent application No. 60/159,525, and U.S. patent application of Rebhan and Nowinski, serial number not yet assigned, entitled Energy Control for an Excimer or Molecular Fluorine Laser, filed Oct. 16, 2000, each of which is assigned to the same assignee as the present application and is hereby incorporated by reference.

Gas Mixture

The laser gas mixture is initially filled into the laser chamber 202 during new fills. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405 and 4,977,573 and U.S. patent application Ser. Nos. 09/317,526, 09/513,025, 60/124,785, 09/418,052, 60/159,525 and 60/160,126, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas, such as xenon, may be added for increased energy stability and/or as an attenuator as described in the Ser. No. 09/513,025 application incorporated by reference above. Specifically, for the F2-laser, an addition of xenon and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%.

Gas Replenishment, General

Halogen and rare gas injections, total pressure adjustments and gas replacement procedures are performed using the gas handling module 206 preferably including a vacuum pump, a valve network and one or more gas compartments. The gas handling module 206 receives gas via gas lines connected to gas containers, tanks, canisters and/or bottles. Some preferred and alternative gas handling and/or replenishment procedures are described at U.S. Pat. Nos. 4,977, 573 and 5,396,514 and U.S. patent application Nos. 60/124, 785, 09/418,052, 09/379,034, 60/159,525, 60/171,717, and 60/159,525, and U.S. patent application of Rebhan and Nowinski, serial number not yet assigned, entitled Energy Control for an Excimer or Molecular Fluorine Laser, filed Oct. 16, 2000, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

Line-Narrowing

A general description of the line-narrowing features of the preferred embodiment is provided here, followed by a listing of patent and patent applications being incorporated by reference as describing variations and features that may used with the preferred embodiments described above for providing an output beam with a high spectral purity or bandwidth (e.g., below 0.6 pm). Exemplary line-narrowing optics contained in the optics module 210 include a beam expander, an optional etalon and a diffraction grating, which produces a relatively high degree of dispersion, for a narrow band laser such as is used with a refractive or catadioptric optical lithography imaging system. As referred to above, the front optics module 212 may include line-narrowing optics (e.g., etalon, birefringent plate, grating, grism) as well (see the Nos. 60/166,277, 60/173,993 and 60/166,967 applications, each being assigned to the same assignee and hereby incorporated by reference).

For a semi-narrow band laser such as is used with an all-reflective imaging system, the grating may be replaced with a highly reflective mirror, and a lower degree of dispersion may be produced by a dispersive prism. A semi-narrow band laser would typically have an output beam linewidth in excess of 1 pm and may be as high as 100 pm in some laser systems, depending on the characteristic broadband bandwidth of the laser.

The beam expander of the above exemplary line-narrowing optics of the optics module 210 preferably includes one or more prisms. The beam expander may include other beam expanding optics such as a lens assembly or a converging/diverging lens pair. The grating or a highly reflective mirror is preferably rotatable and in Littrow configuration so that the wavelengths reflected into the acceptance angle of the resonator can be selected or tuned. Alternatively, the grating, or other optic or optics, or the entire line-narrowing module may be pressure tuned, such as is set forth in the Nos. 60/178,445 and 09/317,527 applications, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror may be positioned before or after the grating which receives a reflection from the grating and reflects the beam back toward the grating, such as in a Littman configuration, or the grating may be a transmission grating. One or more dispersive prisms may also be used, and more than one etalon may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, and 5,946,337, and U.S. patent application Nos. 09/317,695, 09/130,277, 09/244,554, 09/317, 527, 09/073,070, 60/124,241, 60/140,532, 60/147,219 and 60/140,531, 60/147,219, 60/170,342, 60/172,749, 60/178, 620, 60/173,993, 60/166,277, 60/166,967, 60/167,835, 60/170,919, 60/186,096, each of which is assigned to the same assignee as the present application, and U.S. patent Nos. 5,095,492, 5,684,822, 5,835,520, 5,852,627, 5,856, 991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application.

Optics module 212 preferably includes means for outcoupling the beam 220, such as a partially reflective resonator reflector. The beam 220 may be otherwise outcoupled such as by an intra-resonator beam splitter or partially reflecting surface of another optical element, and the optics module 212 would in this case include a highly reflective mirror. The optics control module 214 preferably controls the optics modules 210 and 212 such as by receiving and interpreting signals from the processor 216, and initiating realignment or reconfiguration procedures (see the '241, '695, '277, '554, and '527 applications mentioned above).

Advantageously, the localized heating of transmissive optics of the laser resonator, and particularly the plates of etalons and prisms used in the system of the preferred embodiments, the etalon plates and prisms preferably comprising a material having an absorption coefficient of less than $5 \times 10^{-3}$/cm at 248 nm incident radiation, less than $10 \times 10^{-3}$/cm at 193 nm incident radiation, and less than 0.1/cm at 157 nm, and preferably also having a thermal conductivity greater than 2.0 W/m° C., is reduced over that of transmissive components such as etalons and prisms conventionally having fused silica plates for the following reasons. First, a reduced percentage of the incident photon energy is absorbed by the plates and prisms because of the reduced absorption coefficient of the material of the etalon plates and bulk prism materials. In addition, any localized heating is further reduced in the preferred embodiment over fused silica etalons and prisms because the energy absorbed is dissipated more quickly away from the localized area of photon incidence because of the increased thermal conductivity of the etalon plate and prism bulk materials. Thus, operation at higher laser repetition rates such as 14 mkHz or more is facilitated, wherein the wavelength stability is maintained at 0.1 pm or less.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above. For example, the present invention may be incorporated into laser arrangements disclosed in U.S. Pat. Nos. 5,856,991, 5,901,163 or 5,898,725, each of which is hereby incorporated by reference into the present application. In addition, an etalon similar to that described above may be used for wavelength, bandwidth or energy detection such as are described in U.S. Pat. No. 4,905,243, which assigned to the same assignee as the present invention, and which is hereby incorporated by reference into the present application. Also, to meet the above objects of the invention, a laser system may utilize an optical component other than an etalon, or an etalon exhibiting reduced finesse may be used, or greater beam expansion may be used to reduce the laser power density on the etalon plates.

I claim:

1. An excimer or molecular fluorine laser, comprising:

a discharge chamber containing a laser gas mixture;

a plurality of electrodes within the discharge chamber and coupled to a pulse power circuit for energizing the gas mixture at a repetition rate of at least 1 kHz; and a resonator for generating a laser beam, wherein the resonator comprises line-narrowing and/or selection optics for reducing the output emission bandwidth of the laser beam including at least one device selected from the group consisting of an etalon, a device having a periodic transmission function, a device having a periodic reflectivity function, and an etalon-like device including at least one non-planar, inner reflecting surface, and at least one beam expanding prism including a bulk refractive material, and wherein said device and said bulk refractive material each comprise a material having an absorption coefficient of less than $5\times10^{-3}$/cm at 248 nm incident radiation, less than $10\times10^{-3}$/cm at 193 nm incident radiation, and less than 0.1 cm at 157 nm incident radiation, such that said bandwidth is reduced to less than substantially 0.6 pm and a wavelength of the line-narrowed output beam exhibits a wavelength stability of less than substantially 0.1 pm, and wherein said material of said at least one device and bulk material of said one or more prisms has a thermal conductivity greater than 2.0 W/m° C.

2. The laser of claim 1, wherein said material of said at least one device and bulk material of said one or more prisms has a thermal conductivity greater than 5.0 W/m° C.

3. The laser of claim 1, wherein said at least one device includes a device having a periodic transmission function, and at least one of said one or more prisms of said beam expander is disposed between said discharge chamber and said device.

4. The laser of claim 1, wherein said at least one device includes an output coupler.

5. The laser of claim 1, wherein said material is selected from the group of materials consisting of $CaF_2$, $BaF_2$, LiF, $SrF_2$, $MgF_2$ and fluorine-doped quartz.

6. The laser of claim 1, wherein said material is $CaF_2$.

7. An excimer or molecular fluorine laser, comprising:

a discharge chamber containing a laser gas mixture;

a plurality of electrodes within the discharge chamber and coupled to a pulse power circuit for energizing the gas mixture at a repetition rate of at least 1 kHz; and a resonator for generating a laser beam, wherein the resonator comprises line-narrowing and/or selection optics including one or more at least substantially transmissive optical components for reducing the output emission bandwidth of the laser beam, and wherein each at least substantially transmissive optical component of the line-narrowing and/or selection optics comprises a material having an absorption coefficient of less than $5\times10^{31}$ $^3$/cm at 248 nm incident radiation, less than $10\times10^{-3}$/cm at 193 nm incident radiation, and less than 0.1/cm at 157 nm incident radiation, such that said bandwidth is reduced to less than substantially 0.6 pm and a wavelength of the line-narrowed output beam exhibits a wavelength stability of less than substantially 0.1 pm, and wherein said material of said each at least substantially transmissive optical component has a thermal conductivity greater than 2.0 W/m° C.

8. The laser of claim 7, wherein said material of said each at least substantially transmissive optical component has a thermal conductivity greater than 5.0 W/m° C.

9. The laser of claim 7, wherein said line-narrowing and/or selection optics include a device having a periodic transmission function and one or more beam expanding prisms disposes between said discharge chamber and said device.

10. The laser of claim 7, wherein said line-narrowing and/or selection optics include an output coupler selected from the group consisting of an etalon, a device having a periodic transmission function, a device having a periodic reflectivity function, and an etalon-like device including at least one non-planar, inner reflecting surface.

11. The laser of claim 7, wherein said laser is a molecular fluorine laser, and an output coupler of said laser has a periodic interference function for selecting one of two closely-spaced lines around 157 nm, and said output coupler comprises a material having an absorption coefficient of less than 0.1/cm at 157 nm incident radiation.

12. The laser of claim 11, wherein said output coupler comprises $MgF_2$.

13. The laser of claim 11, wherein said output coupler comprises $CaF_2$ and $MgF_2$.

14. The laser of claim 7, wherein said material is selected from the group of materials consisting of $CaF_2$, $BaF_2$, LiF, $SrF_2$, $MgF_2$ and fluorine-doped quartz.

15. The laser of claim 7, wherein said material is $CaF_2$.

16. A KrF excimer laser, comprising:

a discharge chamber containing a laser gas mixture including krypton, fluorine and a buffer gas of neon;

a plurality of electrodes within the discharge chamber and coupled to a pulse power circuit for energizing the gas mixture at a repetition rate of at least 1 kHz; and a resonator for generating a laser beam, wherein the resonator comprises line-narrowing optics including one or more at least substantially transmissive optical components for reducing the output emission bandwidth of the laser beam, and wherein each at least substantially transmissive optical component of the line-narrowing optics comprises a material having an absorption coefficient of less than $5 \times 10^{-3}$/cm at 248 nm incident radiation of said KrF laser, such that said bandwidth is reduced to less than substantially 0.6 pm and a wavelength of the line-narrowed output beam exhibits a wavelength stability of less than substantially 0.1 pm, and wherein said material of said each at least substantially transmissive optical component has a thermal conductivity greater than 2.0 W/m° C.

17. The KrF laser of claim 16, wherein said line-narrowing optics include a device having a periodic transmission function and one or more beam expanding prisms disposed between said discharge chamber and said device.

18. The laser of claim 16, wherein said line-narrowing optics include an output coupler selected from the group consisting of an etalon, a device having a periodic transmission function, a device having a periodic reflectivity function, and an etalon-like device including at least one non-planar, inner reflecting surface.

19. The laser of claim 16, wherein sail material is selected from the group of materials consisting of $CaF_2$, $BaF_2$, LiF, $SrF_2$, $MgF_2$ and fluorine-doped quartz.

20. The laser of claim 16, wherein said material is $CaF_2$.

21. An ArF excimer laser, comprising:

a discharge chamber containing a laser gas mixture including argon, fluorine and a buffer gas;

a plurality of electrodes within the discharge chamber and coupled to a pulse power circuit for energizing the gas mixture at a repetition rate of at least 1 kHz; and a resonator for generating a laser beam, wherein the resonator comprises line-narrowing optics including one or more at least substantially transmissive optical components for reducing the output emission bandwidth of the laser beam, and wherein each at least substantially transmissive optical component of the line-narrowing optics comprises a material having an absorption coefficient of less than $10 \times 10^{31\ 3}$/cm at 193 nm incident radiation of said ArF laser, such that said bandwidth is reduced to less than substantially 0.6 pm and a wavelength of the line-narrowed output beam exhibits a wavelength stability of less than substantially 0.1 pm, and wherein said material of said each at least substantially transmissive optical component has a thermal conductivity greater than 2.0 W/m° C.

22. The argon fluoride laser of claim 21, wherein said line-narrowing optics include a device having a periodic transmission function and one or more beam expanding prisms disposed between said discharge chamber and said device.

23. The argon fluoride laser of claim 21, wherein said line-narrowing optics include an output coupler selected from the group consisting of an etalon, a device having a periodic transmission function, a device having a periodic reflectivity function, and an etalon-like device including at least one non-planar, inner reflecting surface.

24. The laser of claim 21, wherein said material is selected from the group of materials consisting of $CaF_2$, $BaF_2$, LiF, $SrF_2$, $MgF_2$ and fluorine-doped quartz.

25. The laser of claim 21, wherein said material is $CaF_2$.

26. The laser of claim 21, wherein said material of said each at least one substantially transmissive optical component has a thermal conductivity greater than 5.0 W/m° C.

27. A molecular fluorine laser, comprising:

a discharge chamber containing a laser gas mixture including fluorine and a buffer gas;

a plurality of electrodes within the discharge chamber and coupled to a pulse power circuit for energizing the gas mixture at a repetition rate of at least 1 kHz; and a resonator for generating a laser beam, wherein the resonator comprises line-narrowing and/or selection optics including one or more at least substantially transmissive optical components for reducing the output emission bandwidth of the laser beam, and wherein each at least substantially transmissive optical component of the line-narrowing and/or selection optics comprises a material having an absorption coefficient of less than 0.1/cm at 157 nm incident radiation of said molecular fluorine laser, such that said bandwidth is reduced to less than substantially 0.6 pm and a wavelength of the line-narrowed output beam exhibits a wavelength stability of less than substantially 0.1 pm, and wherein said material of said each at least substantially transmissive optical component has a thermal conductivity greater than 2.0 W/m° C.

28. The molecular fluorine laser of claim 27, wherein said line-narrowing and/or selection optics include a device having a periodic transmission function and one or more beam expanding prisms disposed between said discharge chamber and said device.

29. The molecular fluorine laser of claim 27, wherein said line-narrowing and/or selection optics include an output coupler selected from the group consisting of an etalon, a device having a periodic transmission function, a device having a periodic reflectivity function, and an etalon-like device including at least one non-planar, inner reflecting surface.

30. The laser of claim 27, wherein said material is selected from the group of materials consisting of $CaF_2$, $BaF_2$, LiF, $SrF_2$, $MgF_2$ and fluorine-open quartz.

31. The laser of claim 27, wherein said material is $CaF_2$.

32. The laser of claim 27, wherein said material of said each at least one substantially transmissive optical component has a thermal conductivity greater than 5.0 W/m° C.

* * * * *